United States Patent

Hirota

[15] 3,706,371
[45] Dec. 19, 1972

[54] A FRICTION REDUCED CONVEYING APPARATUS OF HELICAL CHAIN CONVEYOR TYPE

[72] Inventor: Itaru Hirota, 8-15, Nakamachi, 3-chome, Hoya-shi, Tokyo-to, Japan

[22] Filed: Dec. 16, 1970

[21] Appl. No.: 98,583

[52] U.S. Cl. ................................................198/181
[51] Int. Cl. ...........................................B65g 17/00
[58] Field of Search.........198/136, 137, 138, 17, 181

[56] References Cited

UNITED STATES PATENTS

| | | | |
|---|---|---|---|
| 1,933,554 | 11/1933 | Holmes | 198/181 |
| 2,342,468 | 2/1944 | Hallwood | 198/181 |
| 2,694,484 | 11/1954 | Grebe | 198/181 X |
| 3,450,250 | 6/1969 | Frisk | 198/136 |
| 3,458,899 | 8/1969 | Heilbrunn | 198/136 X |
| 2,695,094 | 11/1954 | Riley | 198/17 |

FOREIGN PATENTS OR APPLICATIONS

| 937,110 | 9/1963 | Great Britain | 198/181 |
|---|---|---|---|

Primary Examiner—Richard E. Aegerter
Assistant Examiner—H. S. Lane
Attorney—John B. Armentrout

[57] ABSTRACT

In an apparatus for conveying a product along a helical path, and well suited for the product to be dough, there is provided in combination, a chain and carrier plate means for being moved with the chain, a downward pin connected with the carrier plate means and having an axis disposed laterally of the chain outside the chain from an external side of the chain and the downwardly directed pin carrying an axially downwardly directed roller spaced laterally of the chain outside the chain from the aforementioned external side of the chain, and a support having thereon a facially laterally helical guide rail interposed between the axially downwardly directed roller and the axis of the helical path and laterally facially in contact with the axially downwardly directed roller for guiding the axially downwardly directed roller around the axis of the helical path during movement of the chain.

5 Claims, 3 Drawing Figures

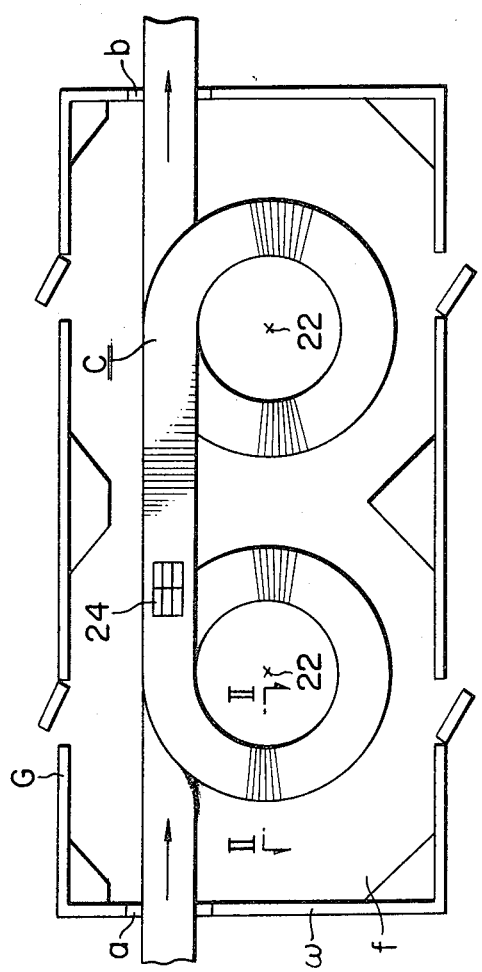
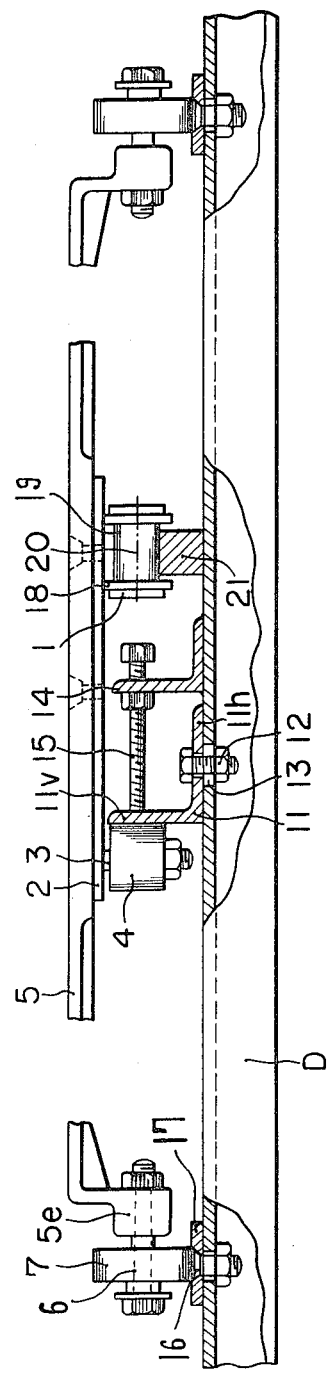

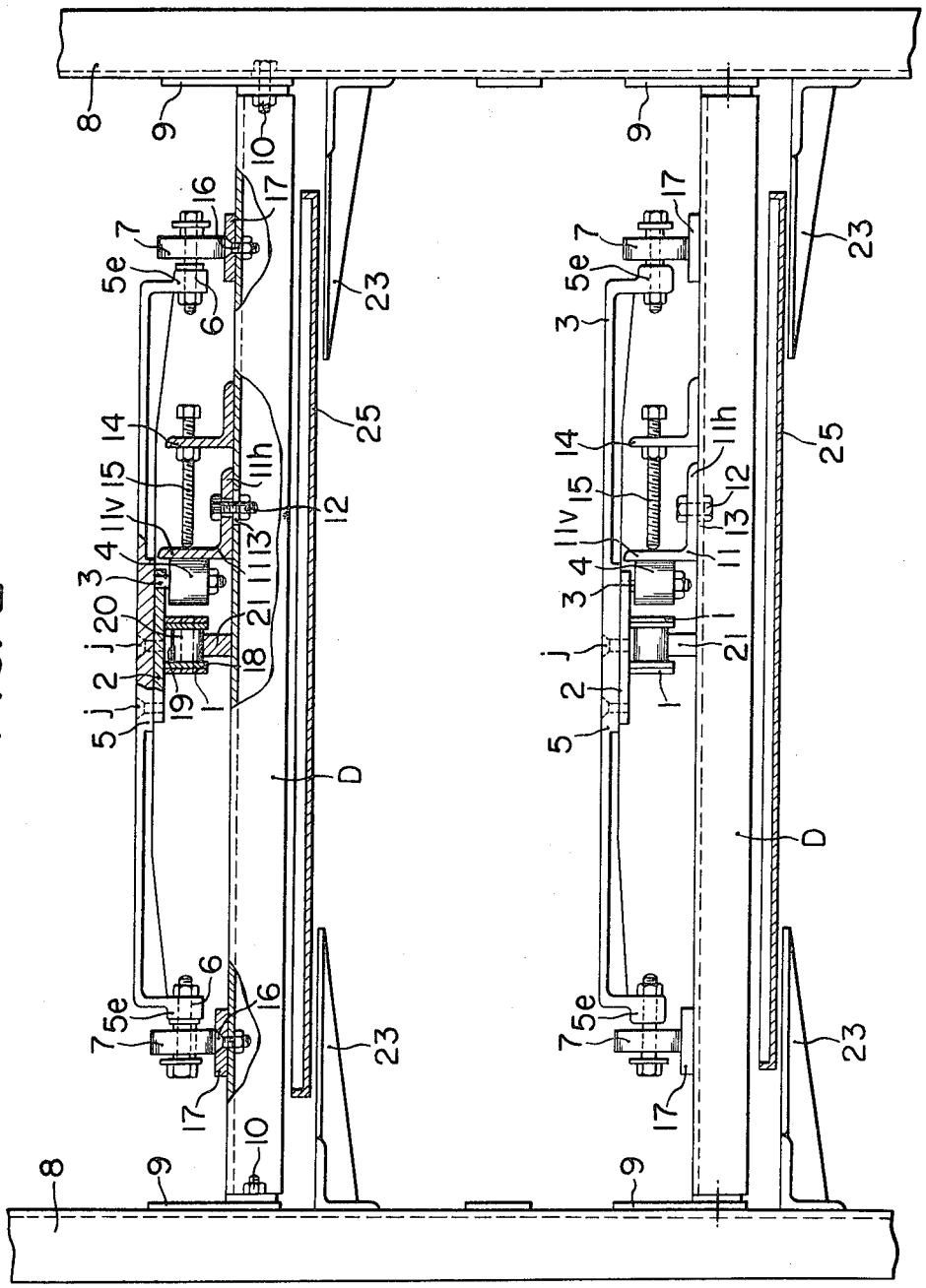

A FRICTION REDUCED CONVEYING APPARATUS OF HELICAL CHAIN CONVEYOR TYPE

DESCRIPTION OF PRIOR ART

Dough conveying apparatus of helical chain conveyor type has more generally been accepted as preferable in the art; however, since a helical chain conveyor tends to move toward the central axis of the helical track particularly in the instance of operation of a very long helical chain conveyor, suitable guide means is demanded on the helical track for preventing such movement. However, guide means provided for the purpose in the prior art oftentimes has been found to be complicated in terms of structure and hence expensive and subject to frequent malfunctions. Moreover, many heretofore known helical chain conveyors have lacked smoothness and safety in operation usually for reasons attributable to excessive friction.

Tension required for moving a chain along a helical track will be proportional to (a) weight of the chain, weight of an object of conveyance, and weight of plate structure for carrying the object, (b) force demanded for lifting the chain along with the object of conveyance and the plate structure carrying the object, and (c) frictional resistance under force tending to move the conveyor chain toward the central axis of the helical orbit. The force described in (c) will be proportional to (d) the pull exerted on the chain and (e) the ratio of pitch of the chain to diameter of the helical track. Aside from the foregoing factors, of course, the tension required for moving a chain along a helical track is increased in accordance with inertial forces which are concurrently introduced elsewhere along the path of the chain in the conveying system, such as along straight portions of the path.

SUMMARY OF THE INVENTION

The present invention relates to product conveying apparatus of helical chain conveyor type and more particularly is concerned with structure in a dough conveying apparatus of helical chain conveyor type whereby friction is reduced.

It is an object of the present invention to achieve improvements in dough conveying apparatus of helical chain conveyor type and accordingly to introduce axially downwardly directed roller means connected with plate members which are united with links of the conveyor chain, having the axially downwardly directed roller means disposed laterally of the chain outside the chain from an external side of the chain for the guide rail member of the helical track to contact and guide the roller means to move around the central axis of the helical track concurrently with movement of the chain.

It is another object of the present invention to provide automatic dough conveying apparatus of helical chain conveyor type having smoothness of operation and low frictional resistance together with being simple and rugged in construction and assuring operation without malfunction.

In accordance with the present invention, there is provided in a product conveying apparatus of the character described, the combination which includes a chain and carrier plate means connected with the chain for being moved with the chain, a downwardly directed pin connected with the carrier plate means and disposed having an axis spaced laterally of the chain outside the chain from an external side of the chain and the downwardly directed pin carrying an axially downwardly directed roller spaced laterally of the chain outside the chain from the aforementioned external side of the chain, and a support having thereon a facially laterally helical guide rail interposed between said axially downwardly directed roller and the axis of the helical path and laterally facially in contact with the axially downwardly directed roller for guiding the latter around the axis of the helical path during movement of the chain.

Several preferred embodiments of the present invention will be described in detail hereinafter by way of example with reference to the accompanying drawings, wherein:

FIG. 1 is a plan view representing a helical chain conveyor leading through a dough raising chamber;

FIG. 2 is a section view partially broken away and on an enlarged scale taken along line II-II in FIG. 1; and FIG. 3 is a section view similar to FIG. 2 showing essential parts in a modified embodiment of the present invention.

DESCRIPTION OF PREFERRED EMBODIMENTS

Referring now more particularly to FIG. 1 of the accompanying drawings, a track for the chain conveyor C leads helically within a dough raising chamber G, the chamber having an entrance for the track at a and an exit for the track at b. A support plate 2 of carrier plate means is integrally connected with pin link plates 1 of the conveyor chain as shown in FIG. 2, such as by welding. A directed shaft or pin 3 projects from the righthand portion of support plate 2 as viewed in FIG. 2 and accordingly is disposed having an axis spaced laterally of the chain outside the chain from an external side of the chain. An axially downwardly directed roller 4 is rotatably mounted on the pin 3 and also, as will be seen in FIG. 2, is spaced laterally of the chain outside the chain from the aforementioned external side of the chain. A flat top plate 5 of the carrier plate means is secured on top of the support plate 2 by means of machine screws j. Opposite lateral end portions of the top plate 5 constitute downwardly directed flanges each having a boss 5e receiving a horizontal pin 6. Each of the horizontal pins 6 are suitably secured to the bosses 5e and carries an axially horizontal roller 7 rotatably mounted thereon.

On the other hand, a plurality of uprights 8 of a support are provided leading vertically upwardly from floor f in the dough raising chamber G. Transverse members D of the support are secured at each of their opposite longitudinal ends to the uprights 8 by suitable fastening means 10, such as bolts, with suitable stringers 9 inserted between the uprights 8 and the transverse members D. A horizontal leg 11h of an L-shaped guide rail member 11 is secured to the transverse member D by clamping means 12, such as bolts. As shown in FIG. 2, the position of the guide rail member can be adjusted laterally of the rail member and with reference to the transverse member D, having the clamping means 12 within an elongated slot 13 which is provided in the transverse member D. Further, a screw rod 15 is threadedly engaged with an L-shaped retainer member 14 welded on the transverse member D. The screw rod more particularly engages the L-shaped retainer member threadedly within an opening through a vertical leg or flange of the latter and has an end abutting the vertical leg 11v of the guide rail 11 on the lefthand side surface of the latter as viewed in FIG. 2, and through releasing the clamping means 12 and turning the screw rod 15, the lateral position of the guide rail 11 may be altered on the transverse member D. The roller 4 is normally maintained in contact with the vertical leg 11v of the guide rail 11 on the lefthand side surface of the latter, also as viewed in FIG. 2. The pair of rollers 7 rotatably mounted on the horizontal pins 6 on both lateral sides of the flat top plate 5 are supported on a pair of rails or guideway members 17 secured on the transverse member D by machine screws 16. Each roller 7 is supported on a roller bearing of moisture resistant and anti-friction material, such as juracon (tradename). Reference numeral 18, in FIG. 2, denotes a roller linkplate, 19 a roller, 20 a pin of the chain, 21 a guideway for the roller 19 of the chain, 23 a bracket member mounted on the upright, and 25 a drip pan for the dough, while in FIG. 1, the reference numeral 22 in each instance designates a central axis of the helical track, and 24 a container for the dough.

In operation, the chain conveyor C, driven by means of a prime mover such as an electric motor (not shown) will proceed into the dough raising chamber G through the entrance a in a direction represented by arrow. At this time, the roller means 4 will roll along the vertical leg 11v of the guide rail 11 while rotating about pins 3, thereby preventing the support plate 2 and top plate 5 thereon from moving toward the central axis 22 of the helical track. Since each roller 4 thus is guided along the vertical or facially laterally helical leg 11v of guide rail 11, the pairs of rollers 7 are constrained to follow along both facially upwardly helical guideways or rails 17. Therefore, the chain conveyor C will operate with individual support plates 2 and flat top plates 5 maintained in substantially laterally horizontal position. Also, in this mode of operation, the action of the rollers 4 against the vertical leg 11v of the guide rail 11, and the action of the rollers 7 against their corresponding guideways 17 greatly alleviate frictional resistance. Hence, the chain conveyor C will operate smoothly and the dough container 24 will be conveyed easily without being shaken or unduly tilted. Since the chain conveyor C is spared undue strain, there is a tendency toward long life and the absence of malfunctions. Moreover, a chain conveyor in accordance with the present invention is considerably economical to use and since the related structure is very simple, the chain conveyor easily can be constructed and supplied at a favorable price.

In FIG. 3, representing a modification of that shown in FIG. 2, the support plate 2 is integrally connected to a pair of roller link plates 18 at upper edges of the latter as by welding. The roller means 4 is located to the left of the pin link plates 1 of the chain and the guide rail member 11 and the retainer 14 for the screw rod 15 are disposed between the roller means 4 and the pin link plates 1 of the chain. The roller means 4 will roll along the vertical leg 11v of the guide rail member 11 in bearing contact with the latter. The roller 19 of the chain, which is rotatably supported between a pair of the roller link plates 18 of the chain, abuts the guideway or rail 21 for the conveyor chain, and will function in the same manner as the roller 19 in the embodiment represented in FIG. 2.

What is claimed is:

1. In an apparatus for conveying a product along a helical path, the combination which includes, a chain and carrier plate means connected with said chain for being moved with said chain, a downwardly directed pin connected with said carrier plate means and disposed along an axis spaced laterally of said chain outside said chain from an external side of said chain and said downwardly directed pin carrying an axially downwardly directed roller spaced laterally of said chain outside said chain from said external side of said chain, a support having thereon a laterally adjustably mounted laterally facially helical guide rail interposed between said axially downwardly directed roller and the axis of said helical path and laterally facially in contact with said axially downwardly directed roller for guiding said axially downwardly directed roller around the axis of said helical path during movement of said chain, and movable thrust means engaged with said laterally facially helical guide rail and said support for moving said laterally facially helical guide rail laterally into a position relatively to said support.

2. In an apparatus for conveying a product along a helical path, the combination as set forth in claim 1 and characterized by including releasable clamp means for releasably clamping said laterally facially helical guide rail to said support in each of a number of positions of lateral adjustment of said rail relatively to said support.

3. In an apparatus for conveying a product along a helical path, the combination which includes, a chain and carrier plate means connected with said chain for being moved with said chain, said chain having links connected with said carrier plate means and further having a horizontal pin interconnecting said links and said horizontal pin carrying an axially horizontally directed roller of said chain, there being a downwardly directed pin connected with said carrier plate means and disposed having an axis spaced laterally of said chain outside said chain from an external side of said chain and said downwardly directed pin carrying an axially downwardly directed roller spaced laterally of said chain outside said chain from said external side of said chain, and a support having thereon a laterally facially helical guide rail interposed between said axially downwardly directed roller and the axis of said helical path and laterally facially in contact with said axially downwardly directed roller for guiding said axially downwardly directed roller around the axis of said helical path during movement of said chain, and said support carrying a guideway and said guideway contacting said chain roller intermediately of said links for guiding said chain while said laterally facially helical guide rail guides said axially downwardly directed roller.

4. In an apparatus for conveying a product along a helical path, the combination which includes, a chain and carrier plate means connected with said chain for being moved with said chain, said carrier plate means having a pair of opposite lateral end portions, a pair of horizontal pins on said opposite lateral end portions carrying a pair of axially horizontally directed rollers positioned so as to interpose said chain intermediately of said pair of axially horizontally directed rollers, and a downwardly directed pin connected with said carrier plate means and disposed having an axis spaced laterally of said chain outside said chain from an external side of said chain and said downwardly directed pin carrying an axially downwardly directed roller spaced laterally of said chain outside said chain from said external side of said chain having said axially downwardly directed roller thus interposed between said chain and one of said pair of axially horizontally directed rollers, a support carrying a pair of inner and outer upwardly facially helical guide rails for said pair of axially horizontally directed rollers and an intermediate laterally facially helical guide rail between said upwardly facially helical guide rails having said intermediate laterally facially helical guide rail disposed between said axially downwardly directed roller and the axis of said helical path and laterally facially in contact with said axially downwardly directed roller for guiding said axially downwardly directed roller around the axis of said helical path while said pair of axially horizontally directed rollers are bearing upon said facially upwardly helical guide rails during movement of said chain, releasable clamp means associated with said laterally facially helical guide rail for releasably clamping said laterally facially helical guide rail to said support in each of a number of lateral positions of said laterally facially helical guide rail relatively to said support, and movable thrust means engaged with said laterally facially helical guide rail and with said support for moving said laterally facially helical guide rail from one to another of said positions relatively to said support while said clamp means is released.

5. In an apparatus for conveying a product along a helical path, the combination as set forth in claim 4, wherein said chain has links connected with said carrier plate means and a horizontal pin of said chain interconnects said links and carries an axially horizontally directed roller of said chain, a guideway being on said support intermediately of said inner and outer upwardly facially helical rails and contacting said chain roller intermediately of said links for said guideway to guide said chain while said laterally facially helical rail guides said axially downwardly directed roller and said inner and outer upwardly facially helical rails guide said pair of axially horizontally directed rollers.

* * * * *